United States Patent [19]

Gilby et al.

[11] Patent Number: 4,713,540

[45] Date of Patent: Dec. 15, 1987

[54] METHOD AND APPARATUS FOR SENSING A MEASURAND

[75] Inventors: Anthony C. Gilby, Foxboro, Mass.; Dale E. Ihnat, Woonsocket, R.I.

[73] Assignee: The Foxboro Company, Foxboro, Mass.

[21] Appl. No.: 755,646

[22] Filed: Jul. 16, 1985

[51] Int. Cl.[4] ............................ G01L 1/10; G01D 5/26
[52] U.S. Cl. .................................. 250/231 R; 73/800; 73/862.59; 250/231 P
[58] Field of Search ............... 250/227, 231 R, 231 P; 73/862.41, 862.59, 655, 705, 800; 350/96.29

[56] References Cited

U.S. PATENT DOCUMENTS

| | | | |
|---|---|---|---|
| 4,379,226 | 4/1983 | Sichling et al. | |
| 4,470,313 | 9/1984 | Kalinoski et al. | 73/862.59 |
| 4,678,905 | 7/1987 | Phillips | 250/227 |

FOREIGN PATENT DOCUMENTS

| | | | |
|---|---|---|---|
| 0090167 | 5/1983 | European Pat. Off. | |
| 2945019 | 5/1980 | Fed. Rep. of Germany | |
| 2146120 | 4/1985 | United Kingdom | 73/862.59 |

OTHER PUBLICATIONS

Rosencwaig, "Photoacoustic Spectroscopy of Solids", Physics Today, Sep. 1975, vol. 28, No. 9, pp. 23–30.
Johnson et al., "Fiber-Optical Relay", Applied Physics Letters, Nov. 1977, vol. 31, No. 10, pp. 675–676.
Balaev et al., "Fiber-Optic Transducers of Physical Field Parameters", Soviet Journal of Quantum Electronics, vol. 14, No. 1, Jan. 1984, pp. 5–17.
Venkatesh et al., "Optically Activated Resonant Sensors", Fiber Optic & Laser Sensors III, SPIE Conference 566, San Diego, Aug. 85, pp. 1–4.
Venkatesh et al., "Optically Activated Vibrations in a Micromachined Silica Structure", Electronic Letters, vol. 21, No. 8, Apr. 1985, pp. 315–317.
Author unknown, "Scots Experts Throw Light on Sensor Problem", Electronics Times (UK), Jul. 1985.

Primary Examiner—Edward P. Westin
Attorney, Agent, or Firm—Terrence Martin; Jack H. Wu; William E. Meyer

[57] ABSTRACT

Vibrating resonant mechanical structures are excited optically by photokinetic energy transfer and detected optically. In particular, a tuning fork sensor measuring a physical parameter is excited into oscillation by radiant energy and the frequency of vibration is detected by radiant energy which may be communicated via an optical fiber. These vibrations are communicated via a fiber optic to a detection location.

27 Claims, 9 Drawing Figures

FIG. 1

METHOD AND APPARATUS FOR SENSING A MEASURAND

BACKGROUND OF THE INVENTION

1. Technical Field

The present invention relates to sensors for use in the process control industries, and more particularly relates to field located devices which sense and communicate process control measurands, or physical parameters, to a control room. The particular sensors of the present invention are photokinetically excited and optically detected, as by fiber optics. Typical measurands include temperature, pressure, differential pressure, flow, level, and the various derivatives of these physical parameters.

2. Background Art

As the advantages of fiber optic based communications and control of industrial processes becomes better known, increasing emphasis is being placed on using various methods of simple, inexpensive, and reliable communication of low level radiant energy via fiber optics to the measurement site, making the desired measurement, and returning the measurement information on fiber optic paths to the control and measurement location. Among the many problems facing designers of such process control systems are the need for minimizing the number of low-light-level optical paths and making accurate and reliable measurements in such a way that the derived measurement information may be communicated by means of fiber optic signals.

An important advantage of transducers according to the present invention is that resonators can be excited directly by radiant energy supplied via an optical fiber. Another advantage of transducers according to the present invention is that the resonant frequency of the resonator is altered by the external physical parameter, which frequency may be remotely sensed. Yet another advantage of the invention is that the resonant frequency can be sensed optically and transmitted along an optical fiber. An advantage of these transducers is that they can be efficiently excited with as little (for example but not limitation) as about 1 microwatt of optical power.

Another significant advantage of the invention disclosed herein is that all electronics at the measurement site are eliminated, reducing susceptibility to lightning or electromagnetic interference (EMI) and electromagnetic pulse (EMP) problems associated with other measurement schemes. All power supply sources at the site are eliminated, reducing maintenance problems.

Yet another advantage of the present invention is that the fiber optic drive and sense method removes an inherent limitation in the ambient temperature range of operation by eliminating electronic circuitry at the sensor site.

The resonant elements in the sensors can be mass produced and inexpensively calibrated to eliminate troublesome and expensive field calibration.

It is known that a beam of steady light can be launched down a first fiber optic path, modulated, and returned to a detection point via additional fiber optic paths. See U.S. Pat. Nos. 4,345,482, 4,275,295, and 4,521,684. It is also known that a first wavelength of radiant energy can be launched down a fiber optic path to power a resonant wire sensor, and a second wavelength of radiant energy can be launched down the same fiber optic path to sense the wire oscillations and return a signal which varies with the vibrations of the wire. See U.S. Pat. No. 4,521,684.

Remote excitation and sensing by fiber optic means is shown in "A Vibrating Wire Sensor with Optical Fibre Links and Force Measurement", by B. E. Jones and G. S. Philp, paper no. 05.1, 'Sensors and Their Applications', UMIST Manchester (UK), Sept. 20-22, 1983. In these disclosures, the measured is sensed by conversion of the physical parameter into a force change which affects the tension applied to the resonant wire. The known methods of remote detection and communication by fiber optic means all require multiple light pathways, independent sources of oscillation energy for the resonant member, intermediate conversion of radiant energy into electrical energy, and relatively high power radiant energy levels to be carried by the fiber optic path. Many configurations not requiring a separate power source at the sensor site still require electrical energy power conversion schemes which limit the design.

Double ended tuning forks exhibiting the high "Q" necessary as resonators for the invention disclosed are described in U.S. Pat. No. 4,372,173. Other resonant mechanical structures are known which change frequency with applied force, such as resonant wires or ribbons, and other piezoelectric crystals.

Low-power optical measurand or physical parameter sensors suitable for process control use are in great demand and result in both low power operation as well as freedom from electromagnetic interference (EMI) and electromagnetic pulse damage sensitivity.

For the purposes of this limited description, "process control" includes both individual variable processes and complex multivariable processes involving a large number of controlled process conditions characterizable as physical parameters or "measurands", such as fluid flow, flow rate, temperature, pressure, differential pressure, level, or the like. "Resonant mechanical structure" as used herein generally refers to beam, hollow-beam, cantilevered beam and cantilevered hollow-beam, and double- or other multiple-beam elements, and ribbon, wire or other articles of manufacture, and their equivalents, all of which can be resonated at particular oscillation frequencies. Specifically included are tuning fork structures of the single- and double-ended varieties, as well as multiple tine tuning fork structures.

When used herein, the terms "photokinetic" and "photothermal" as used in connection with 'stimulation', 'oscillation', 'excite', and the like, refers to methods of initiating motion of a mechanical structure by the localized application of radiant energy at levels which vary over time, so as to create localized stress at the point of application.

As used herein, the term "radiant energy" includes energy of a wavelength between 0.1 and 100 micrometers, and specifically includes infrared, ultraviolet, and visible light energy. For simplicity, such radiant energy may be referred to generally and without limitation as "light" or "light energy". Such radiant energy may be described as "steady" or "continuous" or "continuous wave" in order to distinguish it from radiant energy signals which are modified to carry information. The term "radiant energy" specifically includes both coherent and incoherent light energy. "Modulation" is used broadly herein, and it is intended to mean a process of modifying some characteristics of a light beam so that it varies in step with the instantaneous value of another signal, and specifically may be used herein to describe amplitude modulation. The term "steady" radiant energy as used herein refers to radiant energy having substantially constant intensity levels (that is, absent short term variations in intensity) and having substantially unchanging spectral distribution. In referring to light signals which carry information, the terms "shuttered" and "interrupted" are used to refer to modulated light as well as the mechanism by which the modulation takes place. The radiant energy used for exciting the resonant structure is generally referred to as the "drive" or excitation energy, while the radiant energy sent to the sensor for receiving measurand intelligence is referred to as "sense" light or energy. The radiant energy carrying the intelligence is referred to as the "sense signal" light or modulated sense light".

"Fluids" includes gases and/or liquids. The term "force" is used to describe any physical parameter or phenomenon capable of moving a body or modifying its motion, and specifically includes force exerted per unit area (pressure) and any parameter or phenomenon capable of conversion to pressure. It should be understood, however, that it is generally the force acting on the resonator which causes the frequency of the resonator to vary. In one embodiment hereof, however, temperature change produces a change in the modulus of elasticity of a resonator in order to sense temperature as a measurand.

The term "transducer" is used to describe a device to convert energy from one form to another, and as used herein, the terms "opto-electric transducer" and "electro-optic transducer" more specifically describe the class of devices useful for converting radiant energy to electrical energy and electrical energy to radiant energy.

DISCLOSURE OF THE INVENTION

In a system (such as a process control system) requiring remote detection of one or more measurands, the present invention contemplates apparatus for use in the measurement of the measurand(s) by direct photokinetic stimulation of, and optical detection of, resonant mechanical structure sensors. The invention includes a high "Q" resonant mechanical structure such as a tuning fork or the like, means for communicating the physical parameter to the resonant mechanical structure (usually as a force), at least one radiant energy source, one or more radiant energy pathways such as optical fibers for communicating the radiant energy to a localized area of the resonant mechanical structure, means for directly converting the radiant energy to thermal energy which is conducted within at least a portion of the resonant mechanical structure, and means for returning at least a portion of the radiant energy along at least a portion of one of the pathways.

The tuning fork or other resonant mechanical structure (resonator) receives the physical parameter as a modulus change or as a force operating to vary the resonant frequency of the resonator. Light is launched down the fiber optic to the resonator where it is applied to generate localized heating over a small area of the resonator, e.g., the excitation site. This heating effect generates a thermal current which may be measured in calories per second. The thermal current density is proportional to the light intensity. Only the time-varying component of the light incident on the excitation site is useful in driving the resonator, as it is this time-varying component which is accompanied by local temperature gradients within the resonator medium. The heating causes an expansion and stress in the resonator. The localized heating is enhanced when the excitation site includes means for improving the efficiency of the conversion from light energy to heat energy. Various thin films, such as metal, are appropriate. Efficient absorption and conversion to heat is beneficial. By causing the radiant energy to regularly vary in intensity over time at the heating site, the resonator may be excited into vibration. Light may also be directed to a suitable vibrating surface of the resonator and a portion of that light can be returned to another location and detected. The excitation light may be carried on a first optical fiber and sense light carried on a second optical fiber and returned on a third optical fiber. The sense light may also be returned along the second optical fiber to the detection location.

Alternatively, the excitation light may be of a first wavelength which is selectively directed to the excitation area, and the sensing light may be of a second wavelength discernible from the first wavelength and selectively directed to the resonator vibrating surface and reflected back along the same optical fiber. In this case, a single optical fiber may carry both the excitation and sense light to the sensor site, and also carry the modulated sense light back to a control station. A conventional detector, feedback loop, and signal output circuitry, which are not shown in some of the accompanying illustrations, are located at the central station to complete the feedback loop necessary to sustain drive oscillation of the resonator via optical means.

In another embodiment, both excitation and sense light may be launched down an optical fiber and carried to a point adjacent the resonator where the resonator partially obstructs and shutters the light, returning a portion as a modulated sense light. A portion of the light is initially unobstructed by the shuttering action. By communicating at least a portion of the shuttered light to another location on the resonator (such as via a short optical fiber), this light can be utilized to cause the localized heating required to initiate and sustain the excitation. In this latter case, the phase relationship between the shuttering of the light and the application of the light to the resonator to cause oscillation must be carefully selected for optimum operation. Certain embodiments of the invention disclosed herein may not require an extra fiber to carry excitation light to a separate excitation site; with double tuning forks, excitation and sensing may occur in the same location at certain sites on the resonator.

It should be noted that the localized heating effect may be applied to various locations on the surface of the resonator. With single- and double-ended bifurcated tuning forks, applicants have discovered that application of the radiant energy to the crotch of the fork is particularly desirable. The sense light signal is generally best directed to a location of significant movement in order to obtain maximum sense signal modulation before being returned for detection.

The method of the invention is described as the direct photokinetic stimulation of, and optical detection of, resonant mechanical structures sensing at least one physical parameter or measurand, by performing the steps of: generating radiant energy, communicating pathways (such as optical fibers) to the resonant mechanical structure, then converting at least a portion of the radiant energy to time-varying thermal energy which is dispersed within a portion of the resonant mechanial structure as a localized stress to initiate oscillation of the resonant mechanical structure. Localized heating due to the thermal energy causes expansion at the heated site. By converting the measured physical parameter to a force capable of altering the frequency of the resonant mechanical structure, that resonant frequency may be changed to an analog of the measurand. Then at least a portion of the radiant energy may be returned along the radiant energy communicating pathway(s) for remote detection of the measurand. For the purposes of the description of this invention, such radiant energy may come from an additional radiant energy source, and may or may not be communicated along the same fiber optic pathway.

BRIEF DESCRIPTION OF THE DRAWINGS

Numerous features of the invention disclosed herein will be apparent upon examination of the several drawing figures forming a part hereof, and in which in all views, like reference figures indicate corresponding elements.

BEST MODES FOR CARRYING OUT THE INVENTION

Due to the wide range of variations in carrying out the invention, this description will be limited to several preferred applications known to the inventors solely for the purpose of illustrating the invention and without limiting the scope of the invention.

Figure 1:
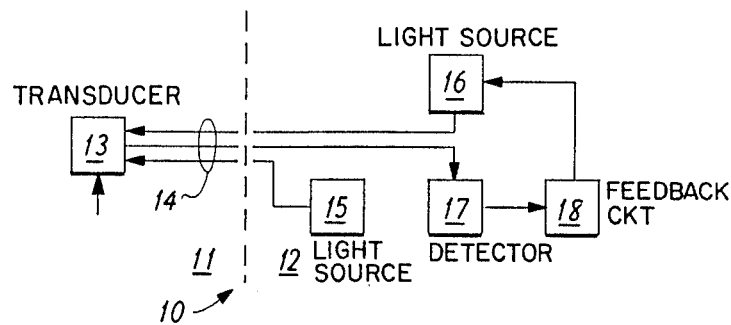
FIG. 1 is a simplified block diagram of the invention for discussion purposes.

There are shown in FIG. 1 the basic elements of the measurand sensor 10 apparatus, in which a transducer 13 is located at a process site 11 separated from a remote site 12, or control station. A physical parameter (here identified as an arrow labeled 'p') is conveyed to transducer 13, which is connected to the control station by one or more fiber optic pathways 14 which are optical fibers. The control station 12 includes a sense light source 15, a drive light source 16, a sense detector 17, and a feedback circuit 18, which are connected to the control station ends of fiber optic pathways.

In operation, drive light source 16 launches a light signal along at least one of the optical fibers to the transducer 13, which light excites a resonator in the transducer 13 into vibration. Sense light source 15 launches a sense light along at least one of the optical fibers to the transducer 13, which sense light is then impressed with time-varying changes (modulated), which are related to the measurement of physical parameter p. The transducer 13 returns the modulated sense light to the sense detector 17, which may be, for example, a photodiode, and which may be located at the control station 12. The photodiode includes a photo-electric transducer which converts the modulated sense light energy to an electrical signal; this electrical signal may be amplified as necessary and communicated to the drive light source via feedback circuit 18 to provide a continuous stream of drive power pulses to drive light source 16, thereby closing the feedback loop. In one embodiment of the invention to be described hereinafter in conjunction with FIG. 6, the feedback circuit is not used, and only continuous (steady-state) drive power is required.

Figure 2:
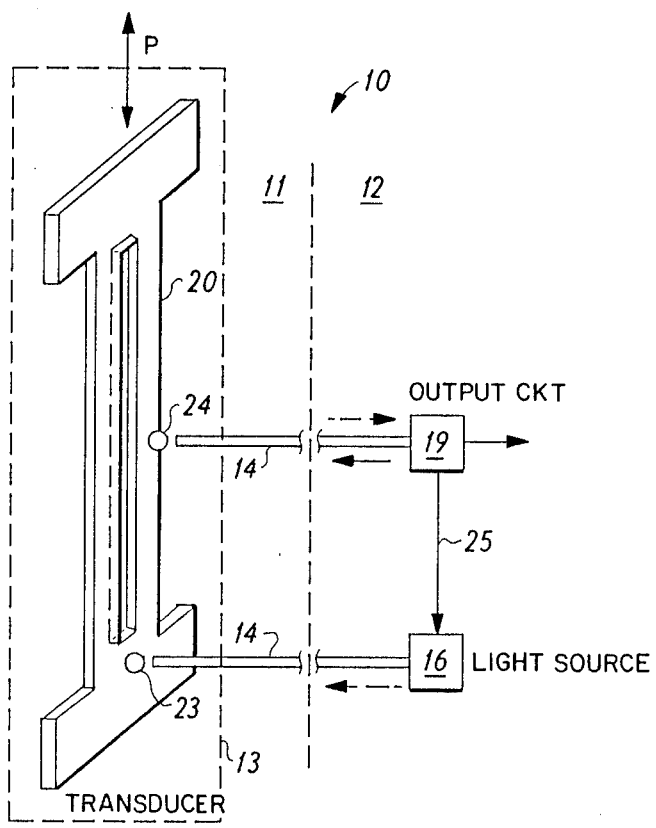
FIG. 2 is a perspective view of a double tuning fork showing particular locations for application of the excitation signal and for directing/reflecting the sense signal.

FIG. 2 is a simplified diagram better illustrating how a particular resonant sensor is excited according to the present invention. In this case the resonator sensor is a double-beam article usually called a double- (or double-ended) tuning fork 20, sometimes abbreviated DIF. It is located at a process site 11 within the previously identified transducer 13. There is a control station 12 which contains a drive light source 16 and sense and output circuit 19. At the process site 11 double tuning fork 20 includes two important areas, a resonator sense site 24 and an excitation site, in this case double tuning fork crotch 23. The double tuning fork, shown much larger and in perspective view here for purposes of explanation only, is connected with the control station via at least one fiber optic pathway such as optical fiber 14. The sense and output circuit 19 and the drive light source 16 are interconnected along feedback path 25.

In operation, light is launched down an optical fiber from LED drive light source 16 to the resonator 20, striking the double tuning fork 20 at an excitation site such as crotch 23. It is believed that the photons photokinetically excite the double tuning fork 20 by generating heat (and therefore stress) at excitation site 23. The light output from drive light source 16 is regularly varied in intensity over time, providing regularly occurring heat-induced stress at the excitation site 23 and thus instituting oscillation of the resonator 20. During vibration of double tuning fork 20, the tines or beam elements thereof flex and the tine moves back and forth perpendicular to the axis of the optical fiber adjacent location 24. Steady state or CW light is launched down the upper fiber 14 to illuminate the fork tine at the resonator sense site 24. The surface of the fork tine is adapted to return by reflection a time-varying intensity of light from the fork back to sense and output circuit 19, where the time-varying intensity is detected and converted to an electrical signal. That electrical signal is returned along path 25 to the drive light source 16 to close the oscillator feedback loop. The physical parameter p to be measured is coupled to the tuning fork to cause a change in the frequency thereof related to the measurand value. A portion of the electrical signal may be output as an electrical analog of the resonant frequency.

Figure 3:
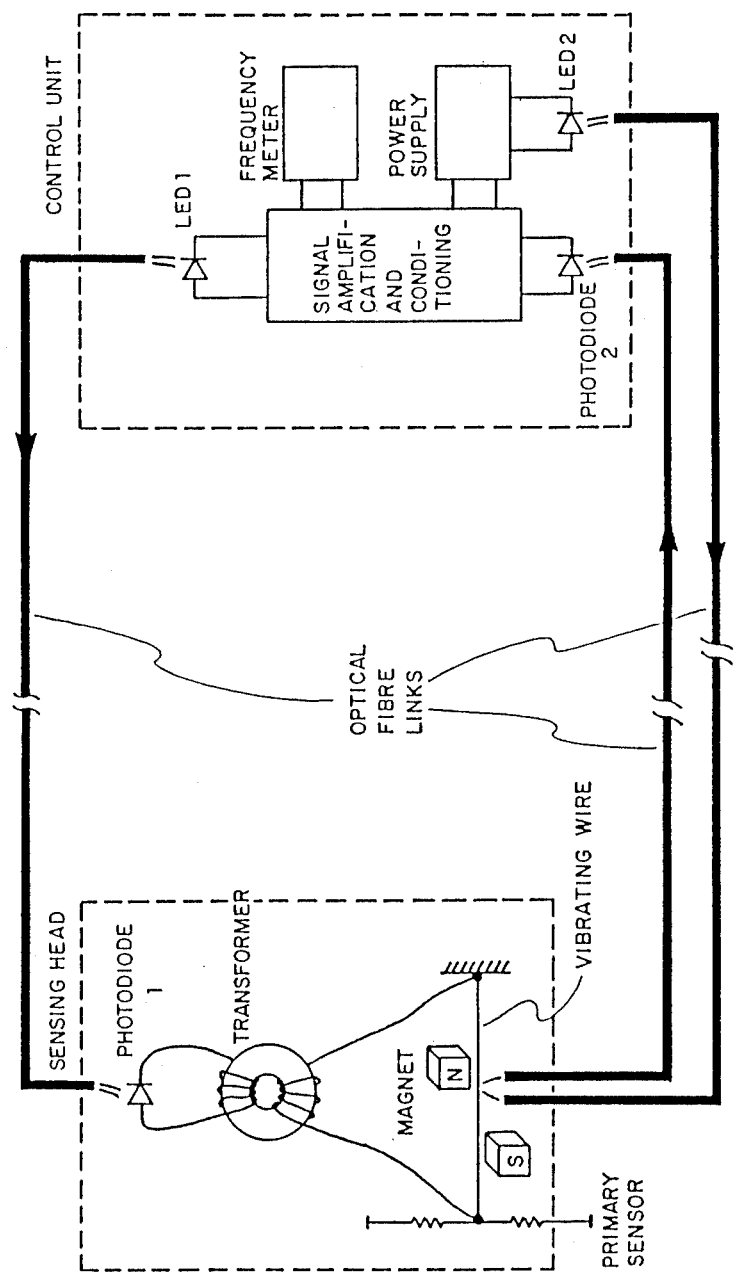
FIG. 3 shows a prior art method of accomplishing a measurand sensing objective, but which requires conversion of the light energy to electrical energy and then to electromagnetic forces in order to power the resonator.

Turning now to FIG. 3, there is shown the related, published work of Jones and Philp. A thin wire is stretched between an anchor post and a pressure diaphragm. The wire is disposed between the poles of a permanent magnet and the two ends of the wire are electrically connected, via a matching transformer, to photodiode #1. If light of alternating intensity is passed from LED #1 via an optical fiber to photodiode #1, then an alternating current is driven through the wire and it moves in a plane perpendicular to that defined by the current and the magnetic field, at a frequency equal to that of the intensity fluctuations. The movement of the wire is sensed by two parallel optical fibers placed in the plane of movement of the wire.

The first of these fibers is fed with light of nominally constant intensity from LED #2 in the control unit. This light on leaving the fiber at the sensing head illuminates the wire. Some light is reflected back into the second of these fibers and returned to the control unit. The intensity of this returned light is a function of the position of the wire relative to the fiber ends. Therefore, as the wire vibrates, alternating light intensity is returned to the control unit in phase with the oscillation. This light is converted into an electrical current by photodiode #2, amplified in the control unit, and a portion used to drive LED #1 in resonance with the wire.

Figure 4:
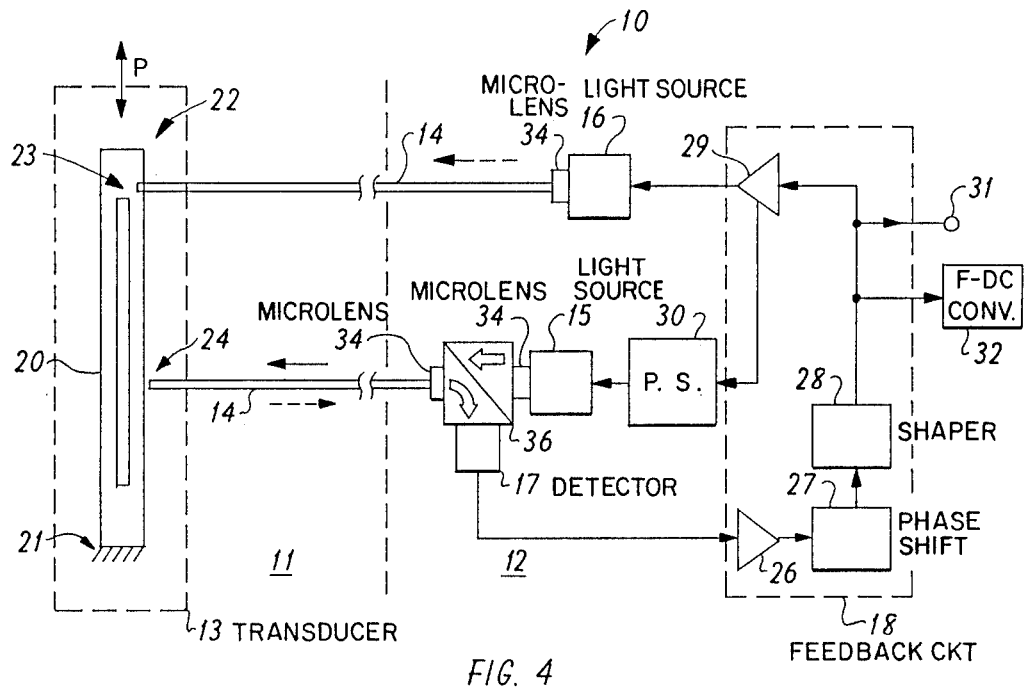
FIG. 4 shows an embodiment of the invention in which separate optical fiber pathways are used for (a) communicating the excitation light signal and (b) for communicating the sense signal to the sensor and returning the modulated sense signal for detection.

Turning now to FIG. 4, there is shown a version of measurand sensor 10 according to the present invention which requires only two fiber optic pathways 14. A transducer 13 is arranged to measure the magnitude of an unknown physical parameter (p). The transducer 13 is located at a process site 11 and is coupled by fiber optic pathways 14 to a control station 12 having signal generating and processing equipment located therein. Although shown schematically as two distinct fiber optic pathways, it will be appreciated that for typical process installations where the distance between field instruments and the control station is about one mile, these two optical fibers 14 may be jacketed in a single cable with appropriate cladding to propagate the radiant energy, or light.

The left-hand portion of FIG. 4 shows the major mechanical elements of the transducer 13, shown in this example as a double tuning fork resonator 20 for the purposes of illustration and not limitation. This assembly, consisting of a resonator fixedly secured at one proximal end 21 is configured such that the physical parameter p is conveyed to the resonator as a force applied to the distal end 22.

The operation of the resonator is understood among mechanical resonator experts, and will be described briefly for others. A beam fixed at both ends in flexural vibration will change its frequency as axial stress is applied to it, or as its modulus of elasticity is changed. In the present novel invention, the sensor usually operates by applying a radiant energy light beam (which is regularly varied in intensity over time) to an excitation site 23 thus instituting oscillation of the resonator 20. When the resonator material is not inherently radiant energy absorbing, as when a double tuning fork is fabricated from fused quartz, photokinetic drive efficiency is comparatively low. Efficiency of the excitation is significantly enhanced by the inclusion of radiant energy absorbing material at the excitation site, if such material is capable of transferring the expansion stress to the resonator material. Molybdenum has been used with success to accomplish this purpose. by applying another stress, usually along the longitudinal axis of the double tuning fork 20, wherein the stress is related to the physical parameter p being measured, the resonant frequency of the oscillating fork tines can be accurately related to the physical parameter. A single-ended tuning fork can be driven by application of the regularly varying light beam energy directly to the crotch of the tuning fork and sensing vibration at the exposed end of one of the tines (see also FIG. 7). As the temperature (e.g., the physical parameter p) of the resonator is varied, the modulus of elasticity of the tine material varies. These effects cause the resonant frequency of the resonator to change with the temperature.

As shown in FIG. 4, the optical fiber 14 from the control station 12 extends to the sensor site 11 and is conveyed to a point in or adjacent the crotch of the double tuning fork 20, here identified as excitation site 23. As will be described hereinafter in association with FIGS. 6 and 9, this is a desirable, but not critical location; other locations on this or other resonator configurations may also be used with success.

In operation, the electro-optical circuitry within the control station 12 shown in FIG. 4 provides the system drive energy through a regulated d-c power supply 30 which delivers a voltage input to a light-emitting diode (LED) sense light source 15 and to a power amplifier 29 which in turn powers a second drive light source LED 16. LED 15 provides, in conjunction with a pair of microlenses 34 and a beam splitter 36, steady-state light into the sense optical fiber for transmission to the resonator 20. The use of microlenses 34 at optical interfaces throughout the system to enhance optical energy transfer is well understood by those of skill in the art. Such lenses are commercially available from Nippon Sheet Glass Company. Fiber optic couplers may be used in place of the beam splitters shown and are suitable for either single- or multi-mode fibers.

It will be appreciated that this overall arrangement, involving a mixture of electrical, mechanical, thermal, and optical elements, defines a closed-loop oscillator. Moreover, as is well known by those of ordinary skill in the art, the system can be designed utilizing appropriate gain and phase shift selection to self-start from the electrical noise present or even from slight vibrations induced within the resonator 20, such that the loop will be at resonance within a few operating cycles.

Considering in more detail the operation of the system shown in FIG. 4, and assuming that the resonator 20 has begun vibrating, an a-c electrical signal will be developed at the sense detector, photodiode 17, whose frequency is equal to that of the resonator. This a-c signal is then applied to a feedback circuit 18. This network 18 consists of an amplifier, preferably a low-level a-c amplifier 26 to amplify the signal from the sense detector, photodiode 17; a correction, or phase shift circuit 27 to compensate for phase differences within the closed loop to sustain oscillation; a pulse shaper 28; and an amplifier, power amplifier 29. The output of the amplifier 29 becomes the drive voltage for the drive light source, LED 16 which is thereby caused to emit a series of pulses of light. These light pulses, transmitted via another microlens 34 and the upper optical fiber 14 to the resonator 20 at the resonator excitation site (in this case the double tuning fork crotch 23), produce localized heating at the crotch which produces motions of the resonator 20 that are precisely synchronized with the motion of the double tuning fork 20 to produce deflection of the resonator with each successive pulse. Thus, the object of the pulse shaper 28 represents the resonant frequency of vibration and hence an analog of the measurand, physical parameter p. This frequency signal may be read out directly at terminal 31, which is the frequency output terminal, or may be alternatively supplied to a converter such as frequency-to-direct current converter 32 to produce a d-c control signal related to the measurand.

In similar fashion, changes to the resonant frequency of vibration caused by changes in the measurand are optically detected and automatically compensated for within the closed loop feedback circuit 18 to produce a new output signal representative of the change in process parameter p. The design details of an appropriate feedback circuit described above are well within the knowledge of a skilled artisan.

Figure 5:
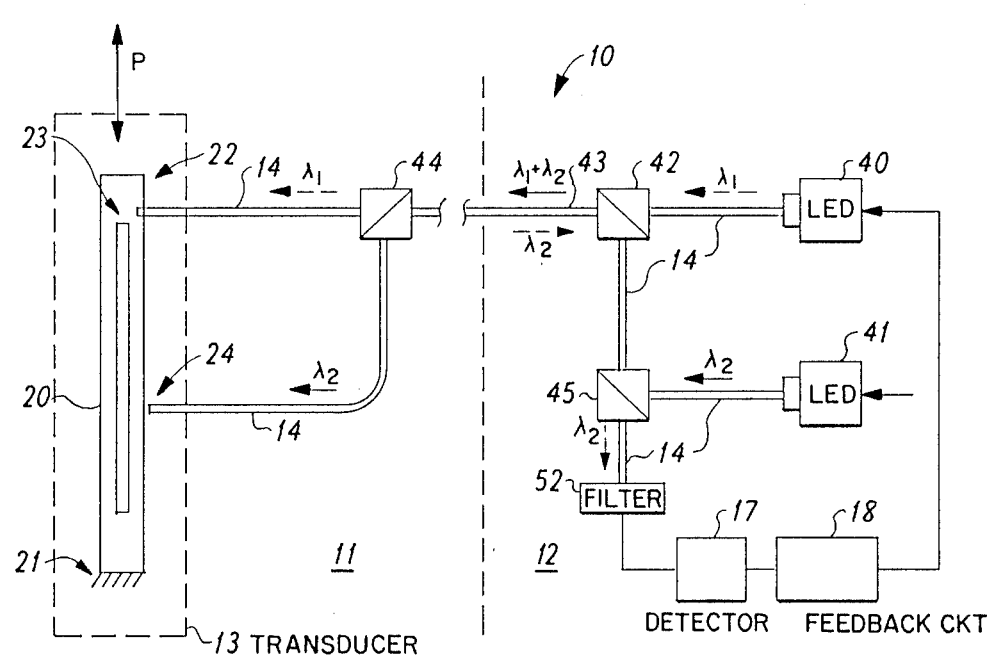
FIG. 5 shows an embodiment of the invention in which a single optical fiber pathway is used to communicate the excitation light signal and the sense signal light to the sensor as well as the modulated sense signal back to the control station.

In certain applications it may be desirable to provide a single optical fiber for communication between the process site and the control station. For these purposes, the measurand sensor 10 arrangement of FIG. 5 may be particularly advantageous. For simplicity, details of the electronic drive and feedback circuitry have been omitted; suffice it to say their operation will be similar to that already presented in detail above in connection with FIG. 4. Here, the outputs of a pair of LED sources, drive light source lambda 1 LED 40 and sense light source lambda 2 LED 41 of discernibly different wavelengths (lambda 1 and lambda 2, respectively) are wavelength multiplexed at a dichroic beam splitter 42. The source lambda 1 LED produces a pulse train of light at a frequency within the operative range of resonator 20 while the sense light source lambda 2 LED 41 provides a steady-state beam of light. These two wavelengths of light are transported from the control station 12 over a single fiber optic pathway to a process-site-located second dichroic beam splitter 44, which beam splitter passes substantially all of the lambda 1 light to the double tuning fork crotch 23 via another optical fiber 14 for driving the resonator, while blocking the lambda 2 light. In turn, effectively all of the steady-state lambda 2 light is reflected by the second beam splitter 44 as the sense signal with essentially none of the lambda 1 light being directed along the lambda 2 light path. The lambda 2 light is directed via another optical fiber to a location of maximum resonator deflection, or resonator sense site such as the fork tine or resonator sense site 24.

Double tuning fork 20, mounted within transducer 13, is secured at one end, proximal end 21, and a longitudinal stress related to the physical parameter p is applied to the other end, distal end 22, to vary the tuning fork 20 resonant frequency as previously described.

The return sense signal is reflected by the double tuning fork 20 from the resonator sense site, beam edge 24 and is as before the steady-state lambda 2 light modulated by beam edge 24 to produce an alternating signal corresponding to the photokinetically induced motion of the resonator 20. The modulated sense signal is returned via the fiber optic pathways 14 and 43 to third beam splitter 45, where a portion of the modulated light is passed therethrough and along an optical fiber to a sense detector 17. A lambda 2 bandpass filter 52 which blocks lambda 1 light may be used to restrict the wavelength of light reaching sense detector 17. This signal is then optically detected at sense detector photodiode 17 and fed back through a suitable network (feedback circuit 18) to close the loop with drive light source 40, thereby setting the pulse train frequency at the resonant frequency of the double tuning fork 20.

Figure 6:
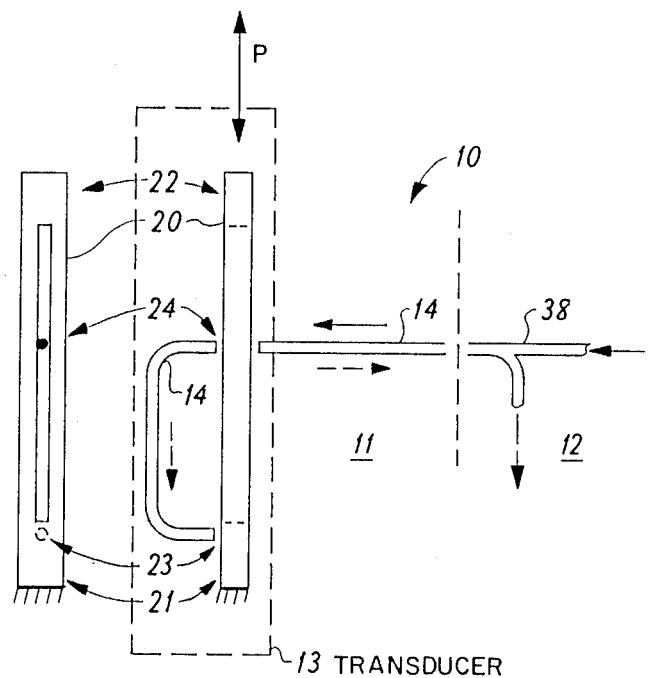
FIG. 6 shows another embodiment of the invention in which a single optical fiber pathway is used to communicate a single light signal to the sensor as both the excitation signal and as the sense signal; the modulated sense return signal is also carried in the single optical fiber pathway.

FIG. 6 illustrates an optically powered, self-oscillating version of the present invention, measurand sensor 10 in which a single optical fiber 14 carries a single light beam to the sensor. More particularly, a steady-state or CW liquid beam is launched down an optical fiber 14 at the extreme right-hand side of the figure; this light is shown by a solid line arrow. The light beam passes from the control station 12 to the transducer 13 located at the process site 11. Double tuning fork 20 is secured at proximal end 21 and a longitudinal stress related to the physical parameter p is applied to distal end 22 to vary the double tuning fork 20 resonant frequency as previously described. The beam of light is directed between the tines of the double tuning fork 20 such that the light is "chopped" when the tuning fork is in motion. Some of the chopped light is passed through the fork during outward excursions of the tines, and picked up by another optical fiber 14. It is carried to the excitation site at the crotch 23 of the double tuning fork 20 to drive the double tuning fork 20 into vibration by localized heating, as is previously described. During inward excursions of the tuning fork tines, the steady-state or CW light is at least partially blocked from passing to the excitation site and is reflected back along the optical fiber 14 to the control station 12 as an alternating intensity light beam. At the control station portions of the alternating light are directed by a fiber coupler or beam splitter 38 to a detector (not shown). Note that it is necessary to ensure that the light pulses arrive at the excitation site at the proper time to enhance motion, i.e., the phasing must be carefully selected to support oscillation. The phase relationship may be modified by introducing thermal wave delay layers between the light absorption coating and the resonator structure.

The self-oscillating version of the measurand sensor 10 shown in FIG. 6 contemplates modulation of the sense signal at the resonator sense site and excitation via an optical fiber 14 directed to the excitation site 23. The location of excitation site 23 and resonator sense site 24 are shown for illustration only. A double tuning fork has its maximum motion at a point of high alternating stress so that light modulation and shuttering of the light-beam-induced photokinetic effect can take place at the same spot. Several such spots have been shown to exist on the resonator, especially double tuning forks 20. One such spot would be the edge of the tine at about the center of the tine along its longitudinal axis. Routine experimentation with this and other forms of resonator will reveal numerous such locations; selection of a particular location depends on the resonator configuration used and is thus left to the artisan to select in a given case.

See also the discussion relative to FIG. 9, hereinafter.

Figure 7:
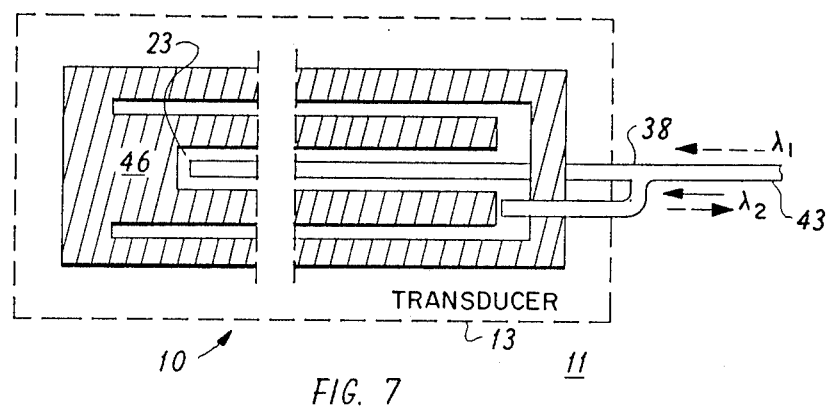
FIG. 7 illustrates a resonator driven and sensed by single fiber optic means in which temperature induced changes in the modulus of elasticity of the resonator enables temperature measurement.

A particular version of the invention useful as a temperature sensor is shown in FIG. 7. Pulses of light at a first wavelength lambda 1, from a light source (not shown) are directed to transducer 13 (at process site 11).

This lambda 1 light travels via fiber optic pathway 43 to fiber coupler 38 at transducer 13. The pulses are in-phase with the resonant vibration, striking an excitation site 23 in the crotch of the resonator 46, exciting the resonator into resonance by the photokinetic effect, as has been described previously. The motion of the tines is in the plane of the paper; the motion is optically detected and returned to the control station (not shown). This sense signal can be launched as steady lambda 2 wavelength down the fiber optic pathway 43, reflected by the resonator tine, and returned via the fiber optic pathway 43.

While numerous materials are suitable for the composition of the single tuning fork 46, fused quartz is particularly useful, as it has been discovered to have a favorable temperature dependence on the modulus of elasticity. The expansion coefficient is small and only a minor contributor to the change of frequency with temperature. It is a stable material for measurement transducers; it is inexpensive and is easily fusion bonded to form a suitable assembly.

Figure 8:
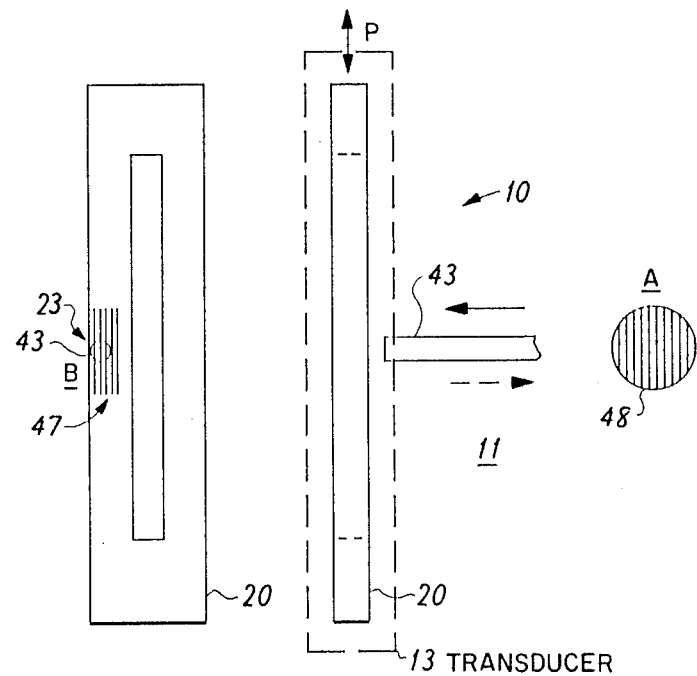
FIG. 8 shows an embodiment of the invention in which aligned, matching patterns on the resonator and at the end of the optical fiber may be used to both drive and sense the resonant frequency of the transducer, and to communicate the sensed measurand back along the same single optical fiber path.

In FIG. 8 there are shown the fundamentals of a measurand sensor 10 utilizing a sense method of particular interest, in which the double tuning fork resonator 20 is optically detected by an efficient method requiring a single fiber. In this configuration, a fiber optic pathway 43 has a pattern B, which may be in the form of alternating high- and low-opacity stripes on its end, as by the application of alternating opaque stripes to the end of a fiber optic pathway such as fiber optic pathway 48. A resonator having a matching pattern 47 applied to the surface thereof at a convenient sense site 24 and the fiber optic pathway 48 are placed in close proximity such that when light is launched down the fiber optic pathway from the control station (not shown) to the process site 11, the light reaching the end of the fiber optic pathway is partially blocked by the pattern 47. Some of the light is permitted to pass by pattern A. The light passing through pattern A strikes a matching reflecting pattern B on the surface of the resonator at the sense site 24. An optically modulated light signal related to the physical parameter p is then returned on the optical fiber. For example but not limitation, alternating stripe patterns of more than 1 micrometer and up to at least 10 micrometers may be used to enhance sense sensitivity of vibration of the fork tines. With a multi-mode fiber ending with a pattern, the fiber diameter can be much larger and still achieve high motion sensitivity. Alternating stripe patterns of about 5 micrometers are particularly useful in sensing low-power driven fork resonators.

Figure 9:
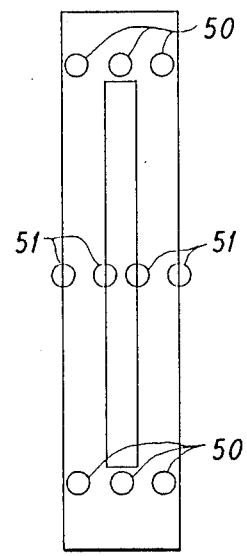
FIG. 9 illustrates the preferred excitation sites and the preferred sense and/or excitation sites on a double tuning fork.

FIG. 9 illustrates several of the more prominent locations for excitation of double tuning forks, sites 50, and several prominent locations for sensing resonator vibration, sites 51. Note that the sense sites 51 may also serve well as excitation areas.

Double tuning forks (DTF) of certain materials, such as quartz, are easily fabricated. It is believed possible to mass produce the DTF elements to common characteristics. Formulas (1) and (2) show the first order expressions for the unloaded operating frequency and for the change in frequency for an applied load. In these formulas, the operating frequency ($f_o$) is the natural resonant frequency of the DTF, in Hertz, with no axial load applied; delta-f ($\Delta f$) is the change in resonant frequency due to an applied axial load; E is the modulus of elasticity along the longitudinal axis of the DTF; F represents the applied axial load, and may be either positive or negative (note that each tine receives one-half of the applied axial load; rho ($\rho$) represents the density of the DTF material, m is the length of the slot, w is the tine width, and t is the thickness of the tines. Formulas (1) and (2) are general as to any fork material or geometry.

$$f_o = (4.73^2/4\pi \sqrt{3})(\sqrt{E/\rho})(w/m^2) \quad (1)$$

$$\Delta f/f_o = (0.074/E)(m^2/tw^3)F \quad (2)$$

Individual DTF elements may be incorporated in transducers which need not be field calibrated.

To accomplish this desirable goal, forks are fabricated such that when installed in completed transducers they exhibit a natural resonant frequency (i.e., are unloaded) below the desired operating frequency, and a change in resonant frequency (delta-f, or $\Delta f$) due to applied axial load divided by the operating frequency versus the axial load applied to the DTF within the desired tolerances. Small metal (or equivalent) pads are placed on the tines near the center of each tine during fabrication.

These small pads, which may be of gold for example, can be reduced by a first laser trimming operation to effectively reduce the density (rho, or $\rho$) of the fork without altering the restoring force of the quartz. A second laser trimming operation may be undertaken to remove some of the beam material thickness (dimension t), to alter the delta-f/operating frequency dependence on the applied axial load. This material removal step may be enhanced by doping or coating the DTF material in certain cases, such as when the DTF is fabricated from quartz. In this second trimming operation, the aim is to alter the stiffness of the fork tines without altering the unloaded operating frequency.

It is believed that the linearity of the DTF may be adjusted by varying the location of the material removed. Also, trimming the width of the tines or length of the slot affects the operating frequency and thus also the dependence of the loaded change in frequency dependence of the operating frequency.

Thus numerous advantages of the present invention have been set forth in detail above. An instrumentation system for process control installations which employs a resonant element sensor has been demonstrated which operates by converting light energy into heat and thence into physical motion, while transmitting measurement data in terms of frequency though optical sensing means. By eliminating electrical transmission between the process site and the control station over electrical conductors, and by eliminating all transducer electrical circuitry at the process site, problems associated with electromagnetic interferences as in past such process control systems have been alleviated. Installation of the optical network operating within process plants may be simplified by eliminating the need for separate optical fiber conductors for powering and sensing by effectively providing improved two-way communication over a single optical fiber. Additionally, the feedback technique of the present invention enables sustaining the vibrations as well as facilitating the maximum amplitude of resonator oscillation for the lowest possible power input. This arrangement thus is particularly suitable to permit the use of low power radiant energy sources for communicating over the distances involved while still maintaining an effective signal-to-noise ratio.

Although preferred embodiments of the invention have been described above, the descriptions are solely for the purpose of illustration and are not intended to be limiting. Numerous modifications will become apparent to those of skill in the art. For example, the invention has been described throughout as operating with resonant element sensors that are activated by the conversion of light energy to localized heating of the resonator. It will be understood that other techniques could be devised for applying the photo energy to the sensor to effect resonant physical motion without departing from the scope of the invention as defined in the accompanying claims.

We claim:

1. Apparatus for use in the measurement of a physical parameter by photokinetic stimulation and optical detection of resonant mechanical structures, comprising:
   (a) resonant mechanical structure means for vibration;
   (b) means for communicating the physical parameter to said resonant mechanical structure means;
   (c) radiant energy source means for providing at least one radiant energy beam;
   (d) radiant energy pathway means for communicating said radiant energy to a first area of said resonant mechanical structure;
   (e) means for directly converting said radiant energy to thermal energy conducted within at least a portion of the resonant mechanical structure to stimulate motion thereof at a frequency related to the physical parameter value; and
   (f) means for returning at least a portion of the radiant energy along at least a portion of said pathway means as a modulated signal related to the resonant structure vibration.

2. Apparatus as in claim 1, further including means for detection of the returned modulated signal, means for providing an output signal related to the returned modulated signal, and means for closing an oscillation loop formed by the radiant energy source means, the radiant energy pathway means, the resonant mechanical structure means, the radiant-to-thermal conversion means, the means for returning a modulated signal, and said means for detection of the returned modulated signal and said means for providing an output signal.

3. Apparatus as in claim 1, wherein the resonant mechanical structure means is a beam structure.

4. Apparatus as in claim 3, wherein the beam structure comprises a single beam.

5. Apparatus as in claim 3, wherein the beam structure is a multiple beam.

6. Apparatus as in claim 1, wherein the resonant mechanical structure is a tuning fork.

7. Apparatus as in claim 1, further including a resonator surface coating which enhances heat absorption.

8. Apparatus as in claim 3, wherein the resonant mechanical structure is hollow.

9. Apparatus as in claim 1, wherein said mechanical structure is an elongated structure including a face surface, a rear surface, and at least one area on the face surface thereof adapted to receive radiant energy and convert said radiant energy to a stress within the resonant mechanical structure.

10. Apparatus as in claim 1, wherein said first area of said resonant mechanical structure is an excitation area and wherein said radiant energy pathway means includes a first fiber optic for communicating excitation energy to the excitation area.

11. Apparatus as in claim 1, wherein said resonant mechanical structure includes an optical modulation sense area and wherein said radiant energy pathway means communicates an optical sense signal to the optical modulation sense area.

12. Apparatus as in claim 11, wherein said first area of said resonant mechanical structure is an excitation area and wherein said sense area and said first area are the same.

13. Apparatus as in claim 1, in which said resonant mechanical structure is adapted for intermittent interruption of said at least one radiant energy beam along said radiant energy pathway means and further including additional radiant energy pathway means for conveying interrupted radiant energy to said first area of said resonant mechanical structure.

14. Apparatus as in claim 1, which is optically excited and is self-oscillating.

15. Apparatus as in claim 1, wherein said first area of said resonant mechanical structure is an excitation area and further including shuttering means for interruption of a portion of the radiant energy, and wherein a single steady radiant energy beam can be communicated along a single fiber optic pathway means to said means for shuttering optical energy, further including means to communicate a portion of the shuttered radiant energy to said excitation area.

16. Apparatus as in claim 11, wherein said first area of said resonant mechanical structure is an excitation area and wherein said sense area and said first area are the same.

17. Apparatus as in claim 15, wherein said resonant mechanical structure further includes means for reflecting radiant energy back along said fiber optic pathway means substantially only during interruption of said radiant energy.

18. Apparatus as in claim 1, wherein said resonant mechanical structure is a multiple beam device having at least two beams, a first one of which includes means for reflecting radiant energy, said radiant energy pathway means is adapted to direct radiant energy to said first area of said resonant mechanical structure, and said means for returning at least a portion of the radiant energy is said means for reflecting radiant energy.

19. Apparatus as in claim 1, wherein said means for communicating radiant energy to said first area of said resonant mechanical structure is terminated by a pattern of alternating reflection and transmission areas, wherein said first area of said resonant mechanical structure includes a matching pattern of alternating areas, one of which group of areas is absorptive, and wherein the two patterns are aligned to facilitate photokinetic stimulation of the resonant structure into vibration and optical reflection of the vibrating frequency.

20. A method for the photokinetic stimulation and optical detection of a resonant mechanical structure sensing at least one physical parameter, comprising the steps of:
   (a) generation of radiant energy from at least one first radiant energy source;
   (b) communicating said radiant energy along at least one radiant energy communicating pathway to a resonant mechanical structure;
   (c) converting at least a portion of the radiant energy to thermal energy;

(d) dispersing the thermal energy within a portion of the resonant mechanical structure as stress to excite vibration of the resonant mechanical structure;

(e) altering the frequency of the resonant mechanical structure as a function of the measured physical parameter;

(f) modulating a portion of the radiant energy according to the frequency of vibration;

(g) returning at least a portion of the radiant energy along said radiant energy communicating pathway as a modulated sense signal; and (h) detecting said modulated sense signal to provide a signal related to the physical parameter.

21. The method according to claim 20, further including the step of feeding back a signal derived from the detected modulated sense signal to the first radiant energy source.

22. The method according to claim 20, further including generation of first radiant energy for photokinetic excitation of the resonant mechanical structure.

23. The method of claim 22, wherein the radiant energy for sensing the vibrating frequency is modulated by the resonant mechanical structure.

24. The method according to claim 22, further including generation of radiant energy for optically sensing the vibrating frequency of the resonant mechanical structure.

25. The method of claim 22, wherein the first radiant energy is of a first wavelength and the second radiant energy is of a second, discernibly different wavelength.

26. The method of claim 25, wherein the first radiant energy and the radiant energy for sensing the vibrating frequency are carried on a single optical fiber.

27. The method of claim 20, wherein step (c) comprises:

(c) shuttering the radiant energy by interruption thereof by a portion of the resonant mechanical structure and conveying the shuttered radiant energy to the portion of the resonant mechanical structure for excitation thereof by converting the shuttered radiant energy to time-varying thermal energy in order to produce self-oscillation.

* * * * *